UNITED STATES PATENT OFFICE.

MARLBOROUGH CONRATH, OF NORTH AUDLEY STREET, COUNTY OF MIDDLESEX, ENGLAND.

METHOD OF MAKING COUNTERPART EMBOSSING-ROLLERS.

SPECIFICATION forming part of Letters Patent No. 350,481, dated October 12, 1886.

Application filed March 30, 1886. Serial No. 197,183. (No specimens.) Patented in England January 27, 1886, No. 1,240.

*To all whom it may concern:*

Be it known that I, MARLBOROUGH CONRATH, a citizen of England, residing at North Audley Street, in the county of Middlesex, England, have invented a new and useful Method of Making Counterpart Embossing-Rollers, of which the following is a specification.

The rollers used for embossing continuous lengths of comparatively yielding material—such as paper, card, linoleum, kamptulicon, or composite materials for covering or decorating walls or other surfaces—have to be made in pairs, the one the accurate counterpart of the other, so that whatever prominences and hollows present themselves on the one must find corresponding hollows and prominences on the other.

My invention relates to a method of making one of a pair of such embossing-rollers which shall be a counterpart to the other, as I will now describe. I first, by engraving or molding, have the one roller made in metal with hollows sunk in its periphery corresponding to the intended protuberances of the embossed design, the rest of the surface of the roller being turned truly cylindrical. I next provide a metal roller of somewhat smaller diameter than the former and mount it under the other in a suitable framing, gearing the two rollers so that they will revolve uniformly together. Both rollers are made hollow with tubular axes, so that they can be heated by steam admitted to their interior. I first heat the lower or plain roller, and while it is revolving along with the other I pass between the rollers a sheet of vulcanite in a soft plastic condition, as it is prepared before baking, this sheet adhering to the heated roller. As it is difficult thus to apply a sheet that will exactly fit the circumference of the roller that has to receive it, I use a strip or band of the soft vulcanite, which becomes wound helically on the roller, and by the pressure upon it while it is in the plastic condition the edges of the successive convolutions are made to cohere, so that the plain roller thus receives a coating of vulcanite all united together as if it were in one piece. I powder the surface of the vulcanite coating with sulphur, and while the rollers continue to revolve I gradually press the one toward the other, so that parts of the vulcanite are made to protrude into the hollows of the upper roller, and the surface of the vulcanite is thus embossed in a manner corresponding to the design on the metallic roller. When the embossing is sufficiently effected, the lower roller is allowed to cool while it still continues to revolve in contact with the upper roller, and when it is cooled it is removed to have the embossed vulcanite hardened. For this purpose the roller with the embossed vulcanite on it is put into a metal casing of larger diameter than itself, and plaster-of-paris is poured in so as to fill up the casing and the hollows of the vulcanite. When the plaster-of-paris has set hard, the casing containing it and the roller is put into an oven, which may be heated by high-pressure steam, and it is there subjected to heat for several hours, which has the effect of hardening the vulcanite. The roller, being then removed from the casing and cleared from the plaster-of-paris, is ready for use along with the upper roller for the purpose of embossing.

Having thus described the nature of my invention and in what manner the same is to be performed, I claim—

The method of making a counterpart embossing-roller by subjecting a heated roller covered with plastic vulcanite powdered with sulphur to the pressure of an embossed roller revolving with it until the vulcanite becomes impressed with the design, embedding the roller thus prepared in plaster-of-paris in a casing, subjecting the whole to heat until the vulcanite becomes hardened, and finally clearing the roller from the plaster-of-paris, substantially as herein described.

In testimony whereof I have signed my name to this specification, in the presence of two subscribing witnesses, this 17th day of March, A. D. 1886.

MARLBOROUGH CONRATH.

Witnesses:
HAROLD IMRAY,
*Patent Agent, 28 Southampton Buildings, London.*
JNO. P. M. MILLARD,
*Clerk to Messrs. Abel & Imray Consulting Engineers and Patent Agents, 28 Southampton Buildings, London, W. C.*